US006837465B2

(12) United States Patent
Lisy et al.

(10) Patent No.: US 6,837,465 B2
(45) Date of Patent: Jan. 4, 2005

(54) FLOW CONTROL DEVICE AND METHOD OF CONTROLLING FLOW

(75) Inventors: Frederick J. Lisy, Euclid, OH (US); Mohammed Modarreszadah, Cleveland Heights, OH (US); Mehul P. Patel, Streetsboro, OH (US); Jack M. DiCocco, Broadview Heights, OH (US); Reed Carver, Aurora, OH (US); Robert N. Schmidt, Cleveland, OH (US); Troy Prince, Cleveland, OH (US)

(73) Assignee: Orbital Research Inc, Cleveland, OH (US)

( * ) Notice: Subject to any disclaimer, the term of this patent is extended or adjusted under 35 U.S.C. 154(b) by 11 days.

(21) Appl. No.: 10/336,114

(22) Filed: Jan. 3, 2003

(65) Prior Publication Data

US 2004/0129838 A1 Jul. 8, 2004

(51) Int. Cl.$^7$ ............................................. B64C 23/06
(52) U.S. Cl. ................................... 244/199; 244/204
(58) Field of Search ............................... 244/199, 201, 244/204, 206, 130; 73/147

(56) References Cited

U.S. PATENT DOCUMENTS

| | | | | |
|---|---|---|---|---|
| 2,478,967 | A | | 9/1949 | Greene ....................... 177/311 |
| 4,435,695 | A | | 3/1984 | Maris ......................... 340/966 |
| 4,727,751 | A | * | 3/1988 | Holmes et al. ................ 73/147 |
| 5,209,438 | A | * | 5/1993 | Wygnanski ................. 244/203 |
| 5,365,490 | A | * | 11/1994 | Katz .............................. 367/1 |
| 5,544,524 | A | * | 8/1996 | Huyer et al. ................... 73/147 |
| 5,598,990 | A | * | 2/1997 | Farokhi et al. ............. 244/199 |
| 5,755,408 | A | | 5/1998 | Schmidt et al. ............. 244/204 |
| 5,890,681 | A | * | 4/1999 | Meng ......................... 244/205 |
| 5,938,404 | A | * | 8/1999 | Domzalski et al. ........... 416/91 |
| 6,105,904 | A | | 8/2000 | Lisy et al. .................. 244/199 |
| 6,380,535 | B1 | | 4/2002 | Wetzel et al. .......... 250/227.14 |

OTHER PUBLICATIONS

K.R. McManus, H.H. Legner, and S.J. Davis; Pulsed Vortex Generator Jets for Active Control of Flow Separation; Jun. 20–23, 1994; 25th AIAA Fluid Dynamics Conference; Colorado Springs, CO; pp 1–12.

Ari Glezer; Shear Flow Control Using Fluid Actuator TEchnology; Abstract; date unknown.

S.S. Ravindran; Active Control of Flow Separation Over an Airfoil; Dec. 1999; pp 1–10.

John C. Magill, and Keith R. McManus; Exploring the Feasibility of Pulsed Jet Separation Control for Aircraft Configurations; Journal of Aircraft vol. 38, No. 1; Jan.–Feb. 2001, pp 48–56.

David Munday and Jamey Jacob; Active Control of Separation on a Wing With Conformal Chamber; 39th AIAA Aerospace Sciences Meeting and Exhibit; Jan. 8–11, 2001/ Reno Nevada, pp 1–10.

K. McManus and J. Magill; Airfoil Performance Enhancement Using Pulsed Jet Separation Control; 28th AIAA Fluid Dynamics Conference, 4th AIAA Shear Flow Control Conference; Jun. 29–Jul. 2/Snowmass Village, CO; pp 1–5.

J.L. Gilarranz, L.W. Traub and O.K. Rediniotis; Characterization of a Compact, High–Power Synthetic Jet Actuator for Flow Separation Control; 40th AIAA Aerospace Sciences Meeting and Exhibit Jan. 14–17, 2002/Reno, NV; pp 1–28.

Mehul Patel, Troy Prince, Reed Carver, Jack DiCocco, Frederick Lisy, and Terry Ng; Control of Aircraft Stall Via Embedded Pressure Sensors and Deployable Flow Effectors; 1st AIAA flow Control Conference Jun. 24–26, 2002, St. Louis, Missouri; pp 2–11.

* cited by examiner

Primary Examiner—Tien Dinh
(74) Attorney, Agent, or Firm—Brian Kolkowski

(57) ABSTRACT

The present invention relates to a flow control device and more particularly to reactive modular flow control device with deployable flow effectors. The present invention further relates to a method of operating the flow control device. One embodiment of the present invention includes a method of controlling air flow across a surface of an aircraft under certain flight conditions comprising the steps of sensing fluid separation from the surface by measuring the pressure on the surface; determining a standard deviation of the pressure measurements over a period of time; and deploying a flow of effector in response to the standard deviation of the pressure measurements exceeding a predetermined threshold number.

12 Claims, 5 Drawing Sheets

FLOW CONTROL DEVICE AND METHOD OF CONTROLLING FLOW

The U.S. Government has a paid-up license in this invention and the right in limited circumstances to require the patent owner to license others on reasonable terms provided for by the terms of grant numbers F33615-98-C-3006 and F33615-99-C-3008 awarded by the Department of Defense, Air Force Research Laboratories (AFRL) at Wright Patterson Air Force Base.

BACKGROUND OF THE INVENTION

1. Field of the Invention

The present invention relates to a flow control device and more particularly to modular flow control device with deployable flow effectors. The present invention further relates to a method of operating the flow control device.

2. Technical Background

In numerous aeronautical and hydrodynamic applications it is desirable to control the flow of fluid across a surface. As fluid flows over a flow surface, like air over an airplane wing or forebody, air over turbine engine blades, or water around the hull of a ship or a submarine, it forms a fluid boundary layer at the surface. The fluid boundary layer is a thin layer of viscous flow exhibiting certain pressure variations that affects the operation of the vehicle surface. The pressure variations within the fluid flow inside the boundary layer directly affect the performance, including the maneuverability and stability, of the vehicle. The oscillation of the pressure variation within the boundary layer correlates the separation and attachment of the fluid flow to the solid surface. The point at which the fluid boundary layer separates from the flow surface is related to the angle of attack (AoA) of the flow surface. In the case of a wing, if separation is too near the leading edge, the wing stalls and the aircraft looses lift and the pilot looses control.

For airplanes the air flowing above and below the wing at different speeds creates the lift necessary to raise or elevate the plane off the ground. The wing causes the air to flow across the upper surface of the wing at a speed faster than the speed of air flowing across the bottom surface. The faster airflow across the upper surface of the wing creates a reduced pressure region known as suction peak along the upper surface of the wing. Due to the generally flat lower surface, a high-pressure zone is created along the lower surface of the wing, thereby generating a net upward force. With a high angle of attack, such as during a steep ascent at takeoff, or a steep descent at landing, there is a tendency of the air flow passing across the upper surface of the wing to become destabilized and separate from the wing. This separation of fluid flow leads to disastrous results because the suction peak on the upper surface of the wing is diminished, and the lift is dramatically reduced while the drag is substantially increased. Therefore, it is beneficial to delay flow separation to the highest angle of attack possible to increase the lift and reduce the drag. To achieve the highest angle of attack possible, there is a need for a means to detect and delay separation via reattaching the flow to the wing surface.

Flow control devices have been employed to control fluid boundary layer dynamics and counteract the boundary layer separation point. These devices are categorized as passive, requiring no auxiliary power, or active, requiring energy expenditure, or reactive, requiring energy expenditure and a feedback control loop. Passive devices, such as fixed vortex generators, tapered fins, scoops, flow-jet injectors and minidomes, protrude into or through the fluid boundary layer to enhance the mixing of fluid flow and thereby control fluid boundary layer dynamics. Passive devices, which involve the presence of a device continually protruding from the flow surface even with no boundary layer flow separation, such as when cruising at a given elevation, leads to increased drag on the flow surface resulting in increased fuel consumption and reduced efficiency of the air vehicle. In addition, with military aircraft the protruding passive flow control devices produce a radar signature compromising the stealth capability of the aircraft.

Active devices, such as synthetic jets, wall jets, active vortex generators, etc., which use auxiliary power for actuation, enhances the mixing of low momentum fluid flow within the boundary layer with high momentum fluid flow outside the boundary layer to prevent separation and delay stall. Most of these active devices operate in an open-loop mode and are slow and relatively unresponsive. Also, while active devices such as mechanical vortex generators can be responsive they also have some limitations. Two types of mechanical vortex generators are deployable flow control devices and pressure active regions. Pressure active regions function by creating vortices using suction or air pressure at various points along the aircraft surface. Pressure active regions due to their nature require, in addition to an electrical system, a separate pneumatic piping system and a central pressure or vacuum source. With these systems, the vacuum or pressure required to generate a vortex to reattach the flow is fairly high at high speeds, which increases the power requirements, weight and the cost of the system. Complications and significant expense can occur with these systems if the lengthy pneumatic systems develop a leak or if the system is activated at a high frequency. Additionally, the openings in the surface of the wing or airfoil may lead to drag and unwanted surface effects. These requirements and complications make such systems bulky, complicated, heavy and expensive. U.S. Pat. No. 6,302,360 to Ng is an example of such a system with some of these limitations. On the other hand, deployable flow effectors have been described in U.S. Pat. No. 6,302,360 to Ng as having other limitations. These are their being relatively slow in response, and high in weight.

The technical advantage of a predictive system over other systems is that in predictive systems, the onset of flow separation can be detected before it occurs and means of control can be employed to avoid separation, thereby eliminating any losses due to flow separation. Current systems such as that described in U.S. Patent to Palmer are illustrative of the state, and limitations of the prior art. Palmer discloses a method for measuring the air pressure differentials between two or more sensors to evaluate certain critical flight parameters. This evaluation, though, provides information about the present flight conditions, for instance, locating a stagnation point on the flow surface. The method disclosed in Palmer cannot determine the incipience of a stagnation point or separation point at any location on the flow surface. It therefore, is not predictive, but historical. As such, any change or modification of the flow surface, for instance the change in the AoA, is reactive not proactive.

In view of the foregoing inherent disadvantages with presently available passive or active flow control systems, it has become desirable to develop a method and a device to be able to predict flow surface dynamic occurrences, including stall, upon their incipience, in order to allow for proactive change or modification of the flow surface to proactively take into account and/or preclude such flow surface dynamic occurrences. Additionally there is a need to develop a reactive modular system operating in a closedloop mode that can be installed or retrofitted relatively easily on existing airfoils. The device should be adapted with controllers and pressure sensors to enable local measurement and feedback for controlling the active deployable flow effectors to reattach the airflow to the airfoil.

SUMMARY OF THE INVENTION

The present invention relates to a flow control device and more particularly to modular flow control device with deployable flow effectors. The present invention further relates to a method of operating the flow control device.

In one embodiment, the present invention includes a method of controlling air flow across a surface of an aircraft under certain flight conditions comprising the steps of a) sensing fluid separation at a surface by measuring pressure at or near the surface; b) calculating a standard deviation of the pressure measurements over a period of time; and c) activating a flow control device in response to the calculated standard deviation of the pressure measurements exceeding a predetermined number.

In another embodiment, the present invention includes a method for determining flow surface dynamics, comprising the steps of a) sensing pressure oscillation in fluid on the flow surface; b) measuring at least one parameter of said oscillation; and c) activating a flow control device in response to the measured parameter exceeding a predetermined limit.

In still another embodiment, the present invention includes an apparatus for determining and predicting flow surface dynamics comprising a) at least one pressure sensor which senses pressure oscillation in fluid on a flow surface and generates a signal corresponding to at least one parameter of the pressure oscillation; and b) a controller which receives the signal, measures and analyzes the at least one parameter of the pressure oscillation, and activates a flow control device in response to the at least one parameter exceeding a predetermined limit.

In still another embodiment, the present invention includes a module for controlling the flow of air across a surface of an aircraft comprising at least one pressure sensor for sensing fluid pressure and at least one flow effector wherein the flow effecter is activated by a controller, either integral or external to the module, in response to pressure sensed with the at least one pressure sensor and/or a pressure sensor external to the module. In still another embodiment, the present invention includes a fluid flow control system for controlling the flow of fluid across a surface of an comprising at least one pressure sensor for sensing fluid pressure, at least one deployable flow effector, and a controller for activating the flow effector in response to pressure sensed with the at least one pressure sensor.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DESCRIPTION OF THE PREFERRED EMBODIMENTS

Figure 1:
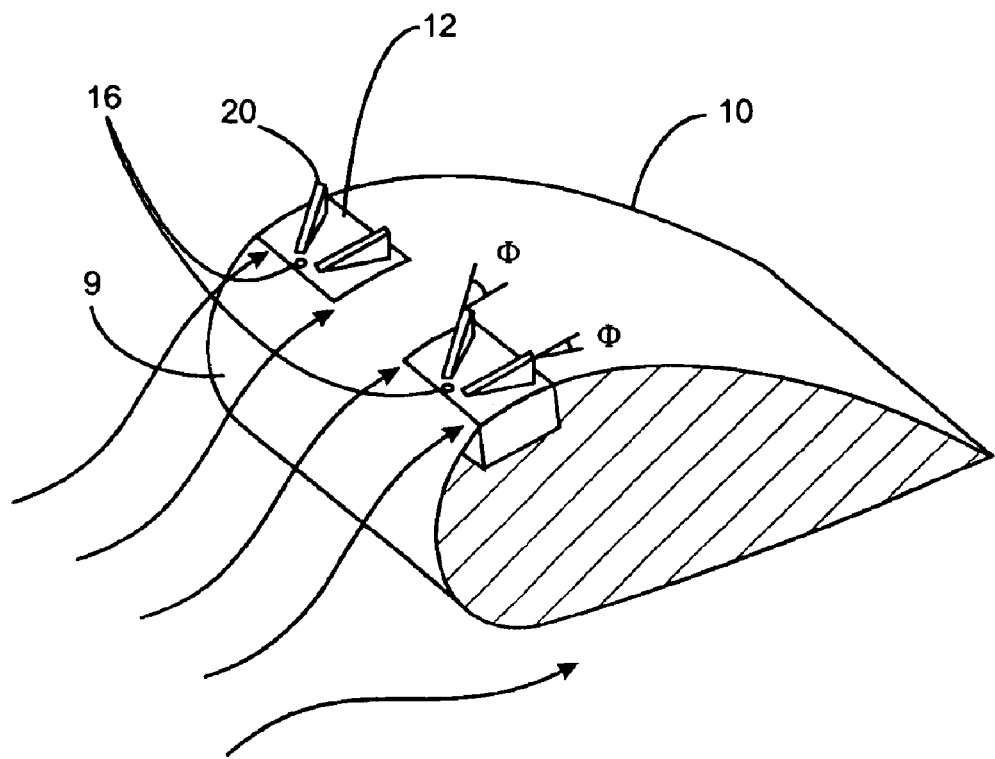
FIG. 1. Perspective view of a section of a flow surface showing fluid flowing there over and modules containing deployed flow effectors and pressure sensors mounted therein.
Figure 2:
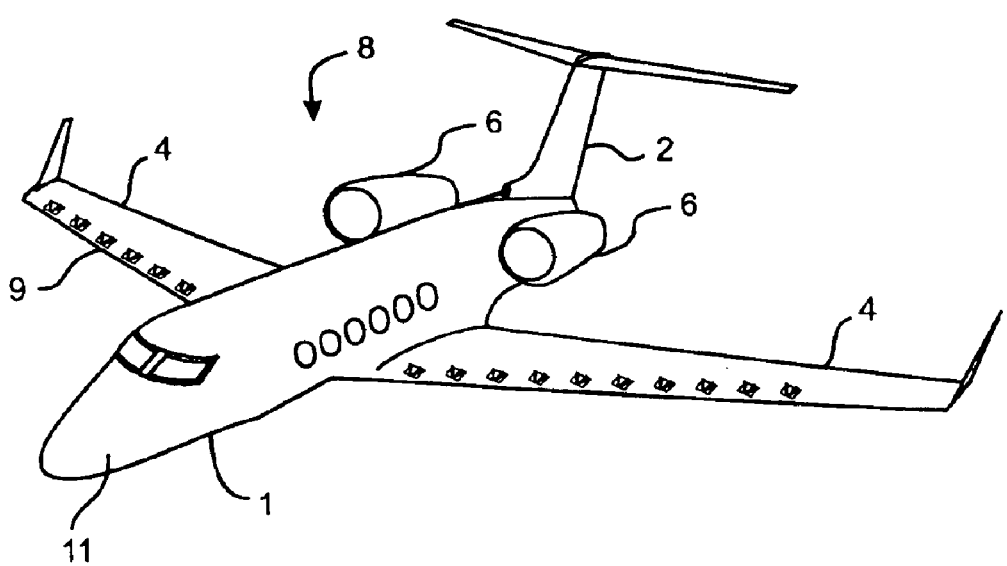
FIG. 2. Schematic view in perspective of an airplane adapted with a vortex generating system of the present invention.

The present invention relates to a flow control device and more particularly to a modular flow control device with deployable flow effectors. The active flow control devices of the present invention include but are not limited to active vortex generators, which are deployable or create pressure active regions by suction or air pressure. The present invention further relates to a method of operating the flow control device. Referring now to FIG. 1, there is shown a perspective view of a section of a flow surface 10 over which fluid flows forming a fluid boundary layer. The fluid boundary layer is a thin layer of viscous flow exhibiting certain pressure variation characteristics and fluid dynamics that affect the operation of the flow surface 10. The fluid may be any fluid such as air, water, etc. The flow surface 10 can be any flow surface 10 of an airplane, ship, motor craft, submarine or the like. FIG. 2 is a schematic view of an airplane 8 adapted with the vortex generating system of the present invention. The airplane can be any type of aircraft, including commercial, military and space vehicles. The airplane 8 includes a fuselage 1, a tail 2, wings 4, nose 11 and jet engines 6. The wings 4 and tail 2 are considered to be airfoils for purposes of this invention. The wings have a leading edge 9, as shown in FIGS. 1 and 2. In this particular embodiment, the flow control modules 12 are located on the wings 4. The wing 4 can be any type of airfoil suitable for providing lift to the airplane. Referring back to FIG. 1, at certain conditions, like a high angle of attack of the flow surface 10, the fluid boundary layer is susceptible to boundary layer separation. Boundary layer separation is caused by a combination of the viscous forces within the fluid boundary layer and an adverse pressure gradient over the flow surface 10. Controlling fluid boundary layer dynamics not only provides an overall benefit to the operation of the flow surface but also counteracts and controls fluid boundary layer separation.

In FIG. 1, a flow effector 20 is movably attached to a module 12 such that the flow effector 20 can be deployed from and/or retracted into the module 12, and into and out of the fluid boundary layer when needed. In FIG. 1 a flow effector 20 is shown deployed into the fluid boundary layer. When retracted, the flow effector 20 may or may not be flush with the flow surface 10. In FIG. 1 the flow effector 20 is shown as a plurality of paired counter-rotating vortex generators. The vortex generators 20 (or flow effectors) are preferably cut on a bias into the direction of the flow of the fluid. The vortex generator shown in FIG. 1 is oriented at an angle "Φ" of preferably about 10° to 25° degrees to the direction of flow of the fluid. The paired arrangement creates counter-rotating vortices on the flow surface 10. Although the flow effector 20 is shown as vortex generators with a particular shape and configuration, any shape or configuration of flow effector 20, can be employed, including but not limited to co-rotating vortex generators, turbulence producers, and vortex manipulators, like strakes. Also, although in FIG. 1 a wing is shown, the flow effector 20 and flow effector modules 12 can be utilized with any flow surface 10, including nose cone, turbine engine, hull of a ship, and the like.

In one or more embodiments of the present invention and as shown in FIG. 1 a pressure sensor 16 is positioned at or near the flow surface 10. The pressure sensor 16 is used to sense flow separation. The pressure sensor 16 can be any type of sensor suitable for measuring the pressure at the flow surface 10. The pressure sensor 16 can for example be a piezoelectric device, which generates an electrical signal in response to a sensed pressure, a shape memory alloy device, or any other pressure sensor or transducer known to those skilled in the art. The pressure sensor 16 and flow effector(s) 20 together form the module 12, one or more specific embodiments of which will be described in more detail later on in this application. Preferably, the ratio of flow effectors to pressure sensors is less than about 3:1, more preferably less than or equal to 2:1, and most preferably less than or equal to 1:1. The higher the concentration of pressure sensors the more redundancy can be built into a system utilizing the present invention.

Figure 3:
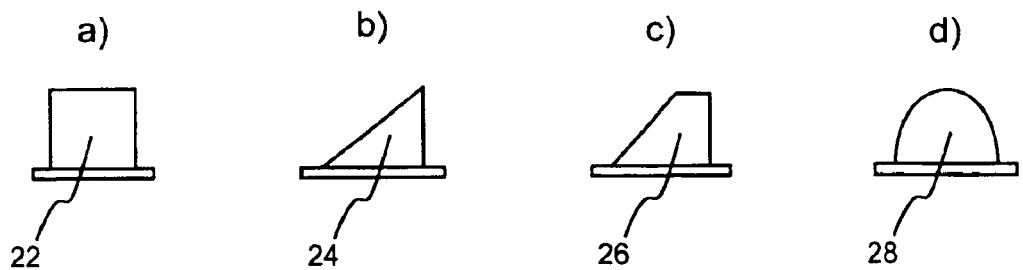
FIG. 3. Cross-sectional view of flow effectors.

Several examples of various embodiments of the flow effectors 20 are shown in FIG. 3. a, b, c and d. These cross-sectional views demonstrate that rectangular 22, triangular 24, irregular 26, semi-circular 28, and square not shown can be used. The present invention is, however, not limited to these shapes and it is envisioned that any shape of flow effector known presently or conceived of in the future by those skilled in the art may be used.

Figure 4:
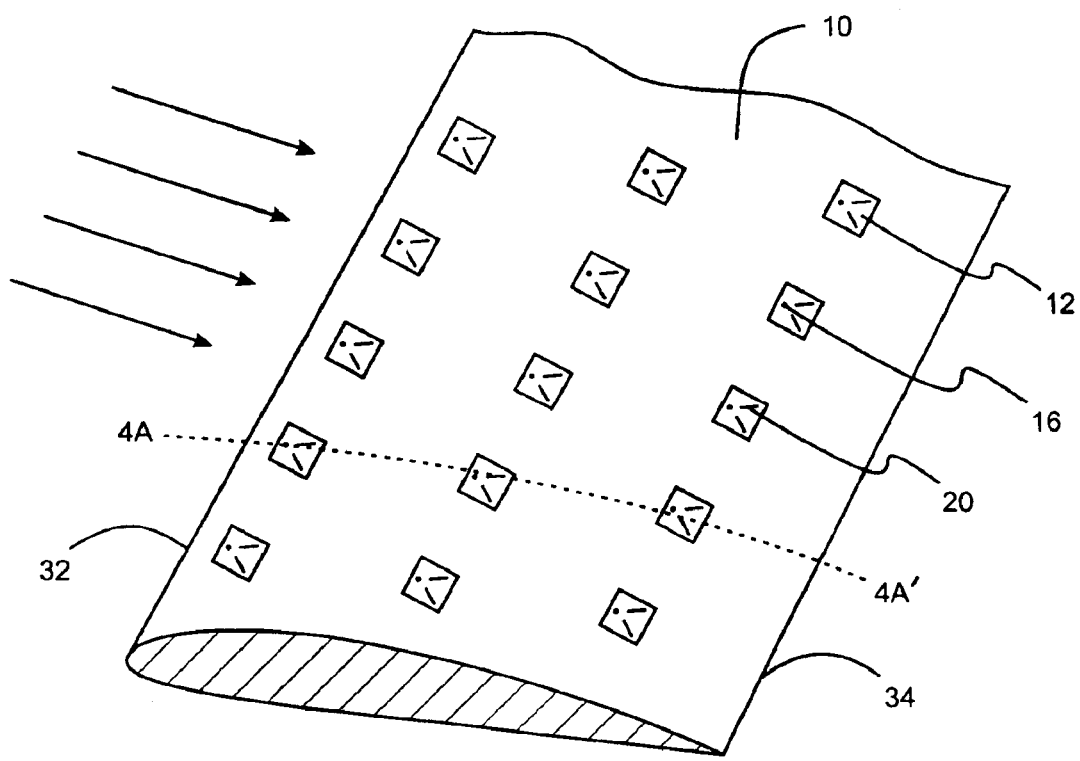
FIG. 4. Perspective view of a section of flow surface showing fluid flowing there over and deployed modules.
Figure 5:
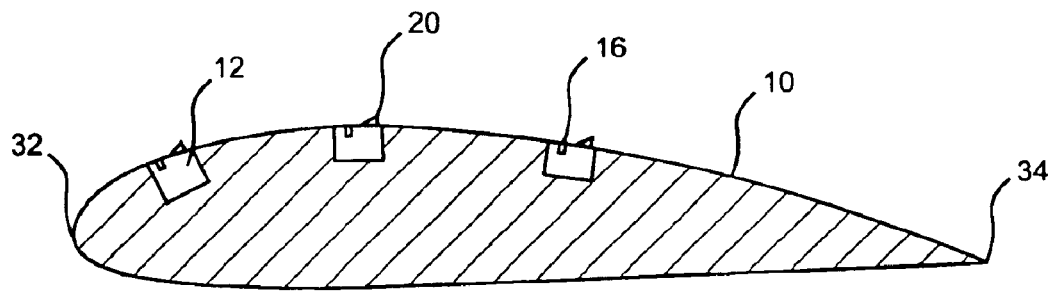
FIG. 5. View of a section of FIG. 4 cut along the line 4A–4A'.

Referring now to FIG. 4, there is shown a perspective view of a section of flow surface showing fluid flowing there over and deployed modules each module comprising at least one pressure sensor 16 for sensing fluid pressure and at least one deployable flow effector 20. Preferably, the pressure sensors of the present invention are flush with the surface of the surface into which the sensors are mounted. In this particular embodiment, the modules 12 are arranged in three rows across a section of the flow surface 10 from the leading edge 32 to the trailing edge 34 of the flow surface 10. By arranging the modules 12 which generate vortices near the trailing edge 34, this embodiment allows for deployment of the flow effectors 20 prior to the flow across the airfoil reaching critical conditions. FIG. 5 is a view of a section of FIG. 4 cut along the line 4A–4A'.

Figure 6:
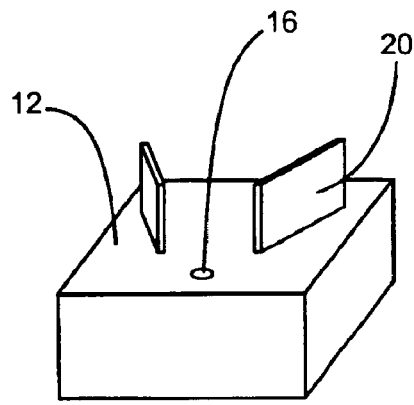
FIG. 6. Perspective view of a module having a pressure sensor, and two flow effectors deployed.
Figure 7:
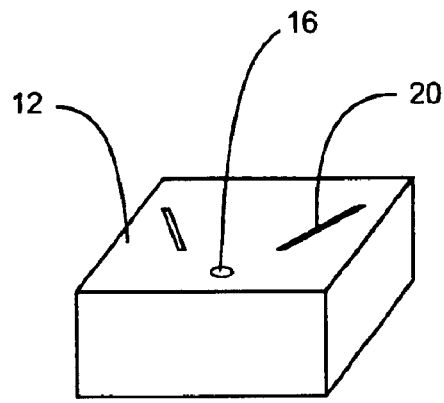
FIG. 7. Perspective view of a module having a pressure sensor, and two flow effectors.

In FIG. 6 and FIG. 7, there are shown perspective views of one embodiment of a module 12 containing two flow effectors 20 and a pressure sensor 16 deployed into and retracted from, respectively, the fluid boundary layer flowing over the flow surface 10. The deploying and retracting can be accomplished using any device such as pneumatic pressure, hydraulic pressure, vacuum, a mechanical device such as a solenoid valve, a microelectromechanical device, any combination thereof or the like. The module 12 may or may not include a controller (not shown) internal to the module. The pressure sensor 16 is connected to the controller (not shown). If the controller (not shown) is not internal to the module 12 then the module 12 preferably further comprises a link between pressure sensor 16 and the controller, and another link between the controller (not shown) and deploying means (not shown). The controller (not shown) is programmed to operate the deploying and retracting means in response to specific pressure conditions sensed at the flow surface 10. The controller (not shown) can be any device such as a computer, suitable for gathering information from the pressure sensors 16 and directing the activation of the flow effectors 20. Where a number of flow effectors 20 and/or pressure sensors 16 (or modules 12) are employed, the controller (or controllers) (not shown) can be programmed and connected to integrate each of the flow effectors 20, pressure sensors 16 or modules 12 so that the output from all of the regions will be coordinated to enhance and possibly optimize the lift, range, and/or maneuverability of the vehicle. Specific patterns of deployment and/or retraction of the flow effectors 10 can be determined to handle routine events, such as takeoff and landing, and other environmental factors, such as wind speed, wind shear and the like, can also be incorporated into the control scheme.

Figure 8:
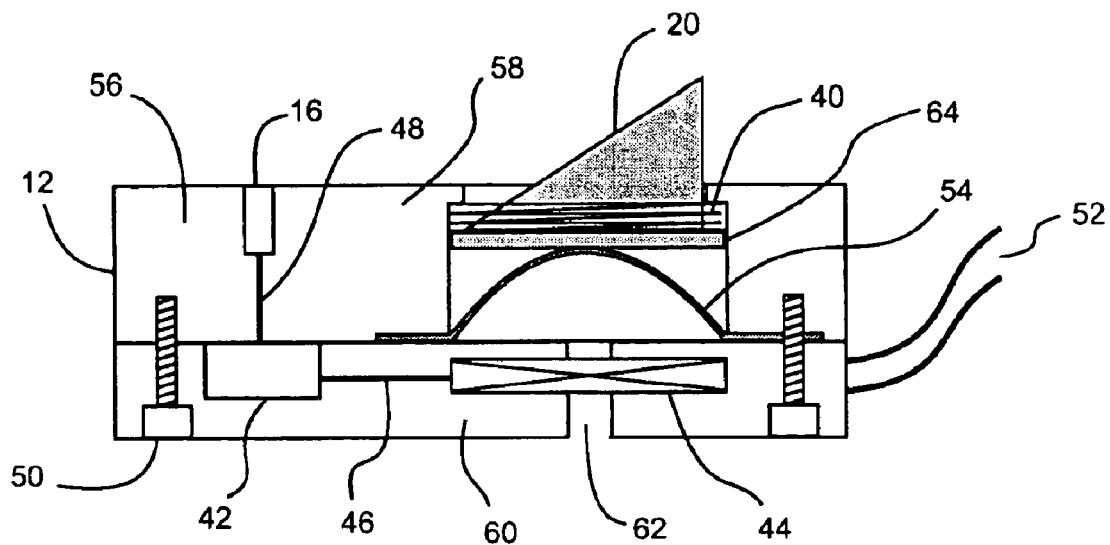
FIG. 8. Schematic detailed view of a module with a deployed flow effector.

FIG. 8 is a schematic, detailed view of a module 12 with a deployed flow effector 20. FIG. 8 is one embodiment of the module 12 shown in FIGS. 6 and 7. In FIG. 8, the flow effector 20 is movably attached to the upper portion 58 of the housing 56 of the module 12 and is attached to the lower portion 60 of the housing 56 of the module 12 by at least two fasteners 50. The upper portion 58 of the housing 56 mates with the lower portion 60 with a sealing ring (not shown) and a sealable, flexible element 54 there between. The flow effector 20 is deployed by pressure being applied to the flexible element 54. The flow effector 20 has a biasing means (a spring) 40 which attaches at one end to the upper portion 58 of the housing 56 and at the other end to the base 64 of flow effector 20. Directly beneath the flow effector 20 is a valve 44, which opens and closes to allow for the application of fluid or gas pressure from a pressure source not shown to be applied to the flexible element 54 through a pneumatic pathway 62. A pressure sensor 16 senses fluid flow at or near the surface over which the fluid is flowing. Preferably the pressure sensor at the surface of the airfoil, and most preferably it is flush with such surface. The pressure sensor 16 can be any pressure sensor but advantageously is a microelectromechanical (MEMS) based or piezoelectric based sensor. The sensor transmits a signal, in this case a voltage but it is understood to one skilled in the art that the signal can be other than voltage, including, but not limited to, current, pressure, hydraulic or optical. The signal corresponds to the pressure it senses.

The pressure sensor 16 is connected to a controller 42 internal to the module 12 (or optionally external to the module). The controller 42 can be for example a proportional-integral-derivative (PID) controller, an adaptive predictive controller, or an adaptive predictive feedback controller. Preferably, the controller of the present invention is integral to the module. The pressure sensor transmits a signal to the controller 42 through the electrical connection 48 (in practical application, multiple pressure sensors 16 send multiple signals to the controller 42). The controller 42 processes the signals to determine, through mathematical modeling, the dynamics of the flow surface 10. Such dynamics include boundary layer separation and stall. It is the predictive ability of the controller 42, which provides for this function and expands this system from being merely responsive. This is especially advantageous for dynamic systems, which are nonlinear and time varying and operating in challenging environments. The controller 42 produces an output signal to a monitor, recorder, alarm and/or any peripheral device for alarming, monitoring, or in some manner, affecting or precluding the dynamics upon its incipience. Advantageously, the controller 42 is the ORICA™ controller, an extended horizon, adaptive, predictive controller, produced by Orbital Research, Inc. and patented under U.S. Pat. No. 5,424,942, which is incorporated herein by reference. Under certain conditions, the controller 42 (or optionally an external controller) which is connected to the valve 44 causes the valve 44 to open thereby resulting in the deployment of the flow effector(s) 20. Preferably, the pressure source (or other deployment and/or retraction means) is internal to the module 12.

Figure 9:
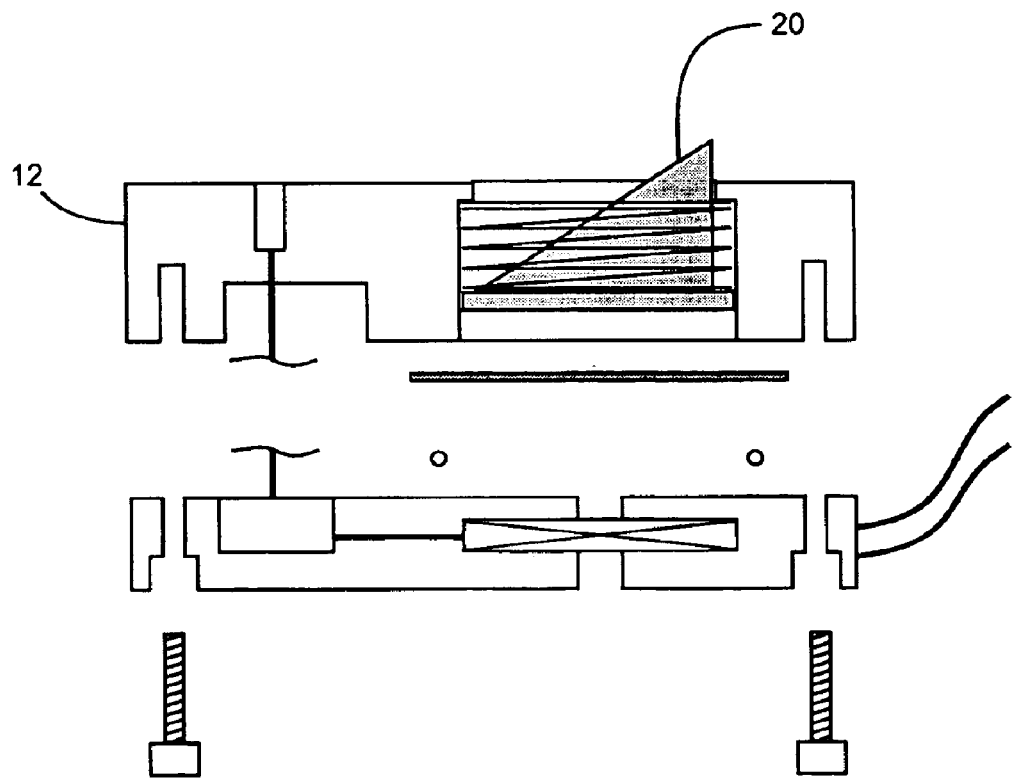
FIG. 9. Exploded, schematic, detailed view of a module with a partially deployed flow effector.

The sealable, flexible element 54 referred to above can be made of a single polymer or a combination of polymers. The pressure source can be air bled from an aircraft turbine engine, a pressurized gas cartridge, or pressurized fluid. The biasing means is employed to urge the sealable, flexible element 54 towards its quiescent state after pressure is removed or reduced. The biasing means can be any device or spring like means, such as vacuum or pressure, mechanical or electromechanical device. FIG. 9 is an exploded, schematic, detailed view of a module 12 with a partially deployed flow effector 20.

Figure 10:
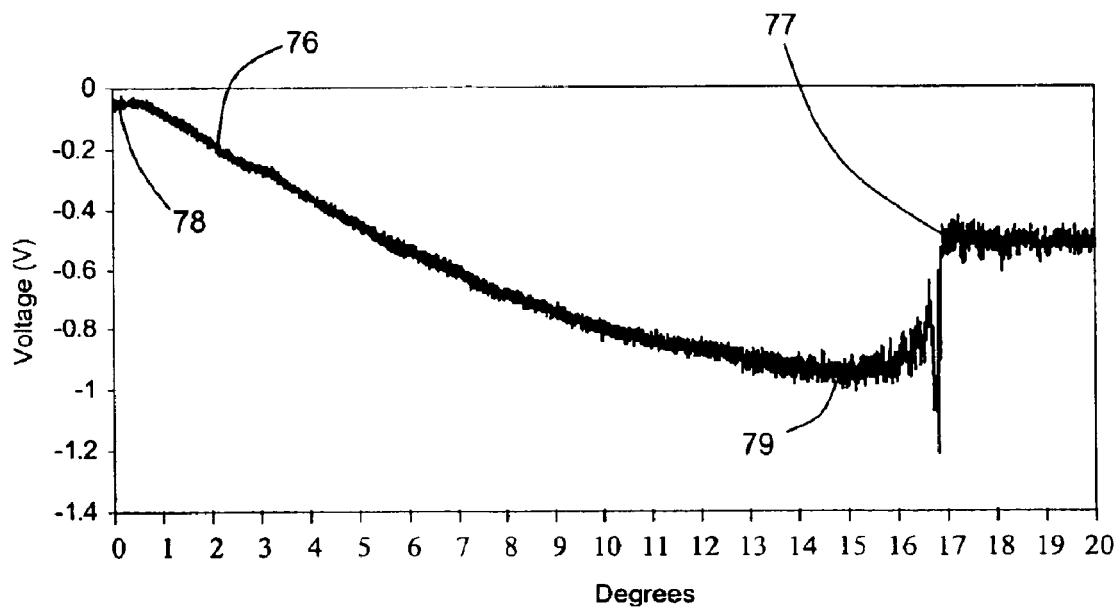
FIG. 10. Graph of the signal, in volts, plotted against the AoA of a flow surface.

Referring now to FIG. 10, there is a graph of the signal 76, in volts, plotted against the AoA of a flow surface, in this case an airfoil under particular flight conditions. Several aspects of the pressure sensed by the pressure sensor 16 can be seen from FIG. 10. First, the voltage, and hence the pressure is seen to drop as the AoA increases from about 0° (78) to 17° (79) at which point the AoA increases to about 19° degrees where a discontinuity occurs. This indicates that the airfoil has reached the stall point 77. The prior art is based upon reading or determining this point. The problem is that this point is detected after it occurs. It is an historical occurrence. The prior art shows that when using arrays of pressure sensors for detecting flow separation it is necessary to monitor the actual loss of pressure between two sensors (pressure differential), which indicates that flow separation has occurred. The problem with this technique is that separation is detected after it occurs, and therefore a historical occurrence is measured.

The present invention shows that the pressure signal has oscillations with certain parameters particularly a variable frequency and amplitude. Although, the oscillations contain noise and other spurious signals, it becomes evident that the frequency and amplitude vary as a function of the AoA and exhibit certain characteristics in relation to the stall point. Various embodiments of the present invention include the approach to identifying the flow separation from an aerodynamic surface just prior to separation using a single pressure sensor is based on the identification of characteristic shifts in the power spectrum of the pressure sensor that occur as the airfoil approaches the stalled condition. This characteristic shift in the pressure data can be identified and used to trigger flow control devices or reduce angle of attack to prevent stall using a number of different computational techniques. The various embodiments of the present invention include but are not limited to the following signal-processing techniques that are utilized to predict the onset of flow separation. These are: (i) the standard deviation technique, (ii) a recursively fit ARMAX system identification model, (iii) the Short-Time Fourier Transform (SFFT) technique, and (iv) time-frequency signal analysis with a variety of different kernels. The present invention would also include other on-line signal processing algorithms known to those skilled in the art, such as wavelet analysis, which is similar to time-frequency analysis with a particular kernel function, to identify the shift in power spectrum associated with imminent flow separation that is discussed herein.

The standard deviation technique operates on the principle that there is an increase in pressure fluctuation as the flow begins to separate from the surface of an airfoil, due to either increasing angle of attack or unsteady flow. A sharp increase in the standard deviation of pressure data is observed immediately prior to stall. To trigger the deployment the flow effectors and initiate fluid flow control, a threshold standard deviation can be calculated for each pressure sensor and programmed into the control strategy.

The second embodiment of a method to identify the shift in measured power spectrum of the signal from the pressure transducer to identify stall utilizes a recursively identified system model, particularly an Auto-Regressive Moving Average (ARMA) model. An example of this type of model is used in Orbital Research Inc's patented predictive adaptive controller referenced herein. The ARMA recursive identification method attempts to fit specific models to the measured pressure data. Evaluation of this data reveals distinct, identifiable model order shifts based upon attached and separated airflow over the airfoil, which can be used to set the deployment of the flow effectors for the control of fluid flow. Further analysis of the frequency spectrum of the data reveals recognizable oscillations in the pressure distribution over the airfoil. This clear characterization alongside the model order shifts allows the ORICA identifier to classify discrete models based upon each flow condition, thus allowing precise control in either flight regime as well as a manner of predicting flow separation along the airfoil. A simple function minimization based upon the error associated with each model during flight will enable adaptive model selection for both control of the flow effectors as well as identification of varying airflow situations across the airfoil. As the airfoil moves toward the stalled condition, the model with the best fits to the data will shift into a higher order model. This model shift foretells the onset of flow separation. A second sub-method of identifying impending flow separation using the ARMA and other related models is to track the poles of the identified system model over time. As the flow moves toward separation, the poles of the identified system model will move toward the region of instability, thereby indicating to the control system that flow separation and thus stall is impending. Either of these two signal identification techniques based on fitting a mathematical model to the system can be utilized to predict impending flow separation. Further, ARMA model can be adapted to resemble other canonical model forms thereby demonstrating similarity to other system identification methods based on Kalman filtering and similar approaches.

A third embodiment of a method for quantifying the power spectrum measured by the pressure transducer is by using Short-Time Fourier Transforms (STFT). A Discrete Fourier transform (DFT), and its numerically efficient complement the Fast Fourier Transform (FFT), both provide frequency information of a digitized signal, such as the pressure measurement recorded by the pressure transducer on the surface of the airfoil. The DFT and FFT both assume that the signal that is being measured is stationary in time. However, in the case of the airfoil and other typical aerodynamic models, the measured pressure signal is not stationary in time, which means a typical DFT/FFT approach is inapplicable. However, for short time periods the signal maybe considered to be stationary. Therefore, it is possible to estimate the mean power spectrum by segmenting the pressure data into epochs lasting anywhere from 0.1–5 seconds each, and then applying a discrete-time Fourier transform (DFT) to the windowed data. The DFT is used to calculate the power spectrum of the signal for that epoch. Then the spectral mean and median density are calculated from the power spectrum of the signals from each epoch. Using this method it is possible to identify specific frequency content in the pressure data. As the flow begins to separate, the frequency spectrum of the measured and analyzed data will shift, which indicates to the control system that flow separation is beginning.

A fourth embodiment of a signal processing method which can provide indications to the control system that flow separation is impending, to enable either deployment of flow re-attachment devices or reduction of angle of attack prior to loss of lift, is to analyze the pressure information using a time-frequency transform. A time-frequency transform enables both frequency resolution and estimation stability for highly non-stationary signals, which typifies some types of pressure data. This is accomplished by devising a joint function of both time and frequency, a distribution that describes the energy and density of a signal simultaneously in both time and frequency. The general form of the time-frequency transform is given by the following $$P(t, w) = \frac{1}{4\Pi^2} \int \int \int e^{-j\theta t - j\tau\omega + j\theta u} \phi(\theta, t) \cdot s^* \left( u - \frac{1}{2}\tau \right) s \left( u + \frac{1}{2}\tau \right) du\, d\tau\, d\theta$$

This transform can be used to calculate instantaneous power spectra of a given signal. The actual transformation distribution is selected by changing the kernel, $\Phi(\theta,\tau)$. The function [e–1] is interesting since it is possible to identify any distribution invariant to time and frequency shifts by means of its kernel, and the properties of the kernel are strictly related to the properties of the distribution, given by [e–1].

The Choi-Williams distribution [Cohen, 1989] is defined by the kernel.

$$\Phi(\theta, \tau) = e^{-\frac{\theta^2 \tau^2}{\sigma}}$$

Where the variable $\sigma$, is chosen to attenuate different portions of the distribution. For small values of $\sigma$, the distribution attenuates the distant portions of the signal in the $(\theta,\tau)$ plane. In multi-component signals (such as aerodynamic pressure signal data where part of the signal is due to flow separation, what we want to measure, and part of the signal air vehicle velocity and spurious cross terms due to air vehicle velocity and other extraneous events which we wish to ignore) the authentic terms are generally close to the origin of the plane while cross-terms are scattered away from it. This means that the Choi-Williams distribution has a tendency to suppress the cross terms without affecting the real signal components. Unfortunately the distribution of real signal components and cross terms is different in different ambiguity planes, which are formed by the choice of $\sigma$. Our work has shown that the choice of $\sigma=1$ is most suitable for pressure analysis to identify impending stall. As the air begins to separate from the airfoil, the mean and median values of the power spectrum of the measured pressure signal will change frequency thereby indicating that flow separation is occurring.

Figure 11:
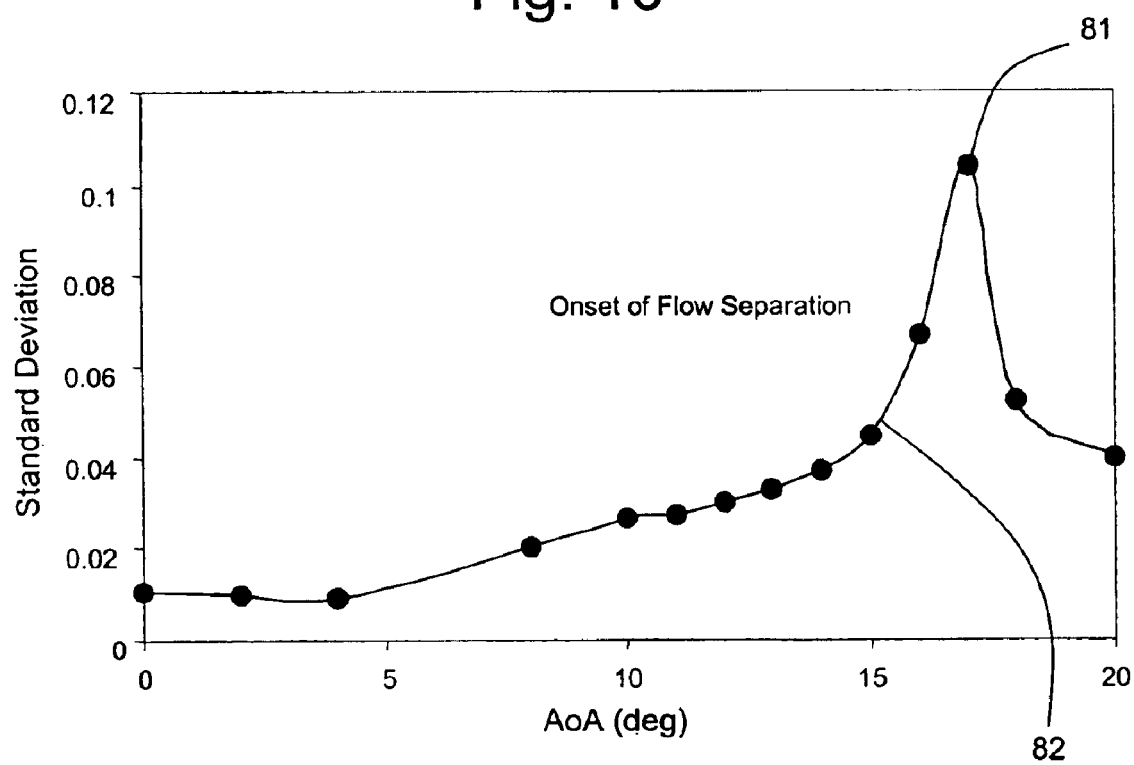
FIG. 11. Graph of the standard deviation of the amplitude of the signal plotted against the AoA of values plotted in FIG. 10.

In one embodiment, the present invention includes a method for determining flow surface dynamics, comprising the steps of a) sensing pressure oscillation in fluid on the flow surface; b) measuring at least one parameter of said oscillation; and c) activating a flow control device in response to the measured parameter exceeding a predetermined limit. The parameter includes but is not limited to amplitude of the pressure oscillation, frequency of the pressure oscillation, standard deviation of the amplitude of the pressure oscillation, mean of the amplitude of the pressure oscillation, and the like. A more specific embodiment of the present invention is referenced in FIG. 11. In FIG. 11, there is shown a graph of the standard deviation of the amplitude of the signal plotted against the AoA of the values plotted in FIG. 10. At about 0.1 standard deviation 81, which occurs at about 18° AoA (the point of stall), the plot takes a pronounced rise. Prior to that rise, though, it can be seen that the standard deviation begins to consistently increase with an associated increase in the frequency of oscillations. It is this consistent increase in the standard deviation, from about 0.01 to about 0.06, and frequency, which is predicting the onset of complete fluid boundary layer separation and, accordingly, the incipience of stall or any other flow surface dynamic occurrence based upon the AoA and other environmental conditions. It is one of the embodiments of the present invention for the controller 42 to deploy the flow effector in response to the standard deviation of the pressure measurements exceeding a predetermined number based on conditions near or at the flow surface 10 preceding such measurement. An example of a predetermined number 82 is the standard deviation of the pressure measurement exceeding 0.06.

Accordingly, the deployable flow effectors 20 of the module 12 can be rapidly and repeatedly deployed into and retracted out of the fluid boundary layer on the flow surface 10 under all types of flow surface operating conditions. Preferably, the deployable flow effectors 20 can cycle at rates of at least 1 Hz, more preferably at rates of at least 5 Hz, even more preferably at least 10 Hz, still even more preferably at 30 Hz, and most preferably at 60 Hz. The flow effector, although light in weight, has sufficient throw to control the dynamics of the fluid boundary layer and does not require peripheral equipment having excessive weight and power requirements. The module 12 and its housing 56 is retrofitably mountable on an operating flow surface 10 like a wing of an existing aircraft, and the module 12 can be easily removed and serviced without requiring extensive downtime of the aircraft or vehicle.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A method of controlling air flow across a surface of an aircraft under certain flight conditions comprising the steps of:
    a) sensing fluid separation at a surface by measuring pressure at or near the surface;
    b) calculating a standard deviation of the pressure measurements over a period of time; and c) activating a flow control device in response to the calculated standard deviation of the pressure measurements exceeding a predetermined number.

2. The method in claim 1, wherein the flow control device uses a vacuum or air pressure to generate a vortex at the surface.

3. The method in claim 1, wherein the flow control device is a deployable flow effector.

4. The method in claim 2, wherein the pressure is measured with a pressure sensor at the surface.

5. The method in claim 4, wherein the pressure sensor and flow control device are components of a module.

6. The method in claim 3, wherein the pressure is measured with a pressure sensor at the surface.

7. The method in claim 6, wherein the pressure sensor and flow control device are components of a module.

8. A method for determining flow surface dynamics, comprising the steps of:

a) sensing pressure oscillation in fluid on the flow surface;

b) measuring at least one parameter of said oscillation; and c) activating a flow control device in response to the measured parameter exceeding a predetermined limit.

9. The method of claim 8, wherein the parameter is the amplitude of the pressure oscillation.

10. The method of claim 8, wherein the parameter is the frequency of the pressure oscillation.

11. The method of claim 9, wherein the parameter is the standard deviation of the amplitude of the pressure oscillation.

12. The method of claim 9, wherein the parameter is the mean of the amplitude of the pressure oscillation.

* * * * *